US011454353B2

(12) United States Patent
Moretz

(10) Patent No.: US 11,454,353 B2
(45) Date of Patent: Sep. 27, 2022

(54) METHOD FOR PREVENTING SPILLS RESULTING FROM PIPELINE FAILURES

(71) Applicant: Safe Crossings, LLC, Jackson, MI (US)

(72) Inventor: R. Dale Moretz, Jackson, MI (US)

(73) Assignee: Safe Crossings, LLC, Jackson, MI (US)

( * ) Notice: Subject to any disclaimer, the term of this patent is extended or adjusted under 35 U.S.C. 154(b) by 0 days.

(21) Appl. No.: 17/096,537

(22) Filed: Nov. 12, 2020

(65) Prior Publication Data

US 2021/0062978 A1 Mar. 4, 2021

Related U.S. Application Data

(63) Continuation of application No. 16/293,448, filed on Mar. 5, 2019, now Pat. No. 10,865,946, which is a
(Continued)

(51) Int. Cl.
*F17D 5/02* (2006.01)
*F17D 5/00* (2006.01)
(Continued)

(52) U.S. Cl.
CPC ............ *F17D 5/02* (2013.01); *B67D 7/3209* (2013.01); *B67D 7/3218* (2013.01); *E21B 43/0122* (2013.01); *F15B 20/005* (2013.01); *F16K 17/02* (2013.01); *F16K 17/34* (2013.01); *F16K 31/12* (2013.01); *F16L 55/1022* (2013.01); *F16L 58/1009* (2013.01); *F17D 1/14* (2013.01);
(Continued)

(58) Field of Classification Search
CPC ....... B67D 7/3209; B67D 7/3218; F17D 5/02; F16L 2201/30; F16L 55/1022; F16K 17/02; F16K 17/34; F16K 31/12; Y10T 137/5762; Y10T 137/7762; Y10T 137/777; Y10T 137/7769; Y10T 137/7791; Y10T 137/7781; Y10T 137/776; E21B 43/0122; F15B 20/005; G05D 16/16
See application file for complete search history.

(56) References Cited

U.S. PATENT DOCUMENTS 3,347,256 A * 10/1967 Dutcher .................... F17D 1/20
 137/115.02
3,628,563 A * 12/1971 Tomita ................ G01M 3/2807
 137/460
(Continued)

*Primary Examiner* — Atif H Chaudry
(74) *Attorney, Agent, or Firm* — Quinn IP Law

(57) ABSTRACT

A petroleum pipeline safety system for preventing contamination of an environmentally sensitive area close to a pipeline includes an upstream portion of the pipeline supplying a flow of fluid material, a crossing portion of the pipeline receiving the flow of fluid material from the upstream portion and conveying the flow of fluid material through the environmentally sensitive area to a downstream portion of the pipeline, the downstream portion, a pipeline pressure activated valve selectively capable of blocking the flow of fluid material from entering the crossing portion based upon a change in pressure within the crossing portion, and a fluid capacitor connected to the upstream portion configured to filter out a pressure spike in the upstream portion associated with the valve blocking the flow of fluid material.

12 Claims, 6 Drawing Sheets

Related U.S. Application Data continuation-in-part of application No. 15/817,245, filed on Nov. 19, 2017, now abandoned.

(60) Provisional application No. 62/424,444, filed on Nov. 19, 2016.

(51) Int. Cl.
| | | |
|---|---|---|
| *F17D 1/14* | (2006.01) | |
| *F16L 58/10* | (2006.01) | |
| *B67D 7/32* | (2010.01) | |
| *F16K 17/02* | (2006.01) | |
| *F16L 55/10* | (2006.01) | |
| *F16K 17/34* | (2006.01) | |
| *F16K 31/12* | (2006.01) | |
| *E21B 43/01* | (2006.01) | |
| *G05D 16/16* | (2006.01) | |
| *F15B 20/00* | (2006.01) | |
| *G01M 3/28* | (2006.01) | |

(52) U.S. Cl.
CPC .............. *F17D 5/00* (2013.01); *F17D 5/005* (2013.01); *G01M 3/2815* (2013.01); *G05D 16/16* (2013.01); *F16L 2201/30* (2013.01); *G05B 2219/31356* (2013.01); *Y10T 137/0452* (2015.04); *Y10T 137/7727* (2015.04); *Y10T 137/7762* (2015.04)

(56) References Cited

U.S. PATENT DOCUMENTS

| | | | | |
|---|---|---|---|---|
| 3,664,357 | A * | 5/1972 | Kreiss | G01M 3/2807 137/2 |
| 3,690,150 | A * | 9/1972 | Mullen | F17D 5/02 73/40.5 R |
| 3,702,744 | A * | 11/1972 | Brown et al. | F17D 5/06 417/12 |
| 3,952,759 | A * | 4/1976 | Ottenstein | F16K 37/00 137/12 |
| 4,240,463 | A * | 12/1980 | Moore | F16K 17/00 137/488 |
| 10,865,946 | B2 * | 12/2020 | Moretz | F17D 1/14 |
| 2008/0000542 | A1 * | 1/2008 | Cohen | F17C 7/00 141/18 |
| 2018/0297089 | A1 * | 10/2018 | Wouters | B08B 9/0328 |

* cited by examiner

METHOD FOR PREVENTING SPILLS RESULTING FROM PIPELINE FAILURES

CROSS-REFERENCE TO RELATED APPLICATIONS

This disclosure is a continuation of U.S. patent application Ser. No. 16/293,448 filed on Mar. 5, 2019 which is a continuation-in-part application of U.S. patent application Ser. No. 15/817,245 filed on Nov. 19, 2017 which claims priority to U.S. Provisional Patent Application 62/424,444, filed on Nov. 19, 2016, all of which are hereby incorporated by reference.

FIELD OF INVENTION

The present invention relates to the field of fluid transfer and transportation systems, specifically pipelines, and methods to reduce the risk of leakage and resulting loss of transported material and/or environmental damage in the event of a breach of the pipeline.

BACKGROUND OF THE INVENTION

The statements in this section merely provide background information related to the present disclosure. Accordingly, such statements are not intended to constitute an admission of prior art.

Many fluid materials, including petroleum and petroleum products, are transported over long distances through pipelines. These pipelines cross over a variety of natural features, including features which could be severely damaged in the event of spills resulting from breaches of the pipeline. These natural features include streams, lakes, expanses of ocean, bogs and marshes, aquifer watersheds, and others. In these areas, cleanup and remediation would be particularly difficult and expensive, and would likely be impossible to completely remediate.

Many of the pipeline sections crossing such sensitive areas are not modified to reduce the risk of spills or to minimize the environmental damage that would result from such spills. Several incidents of damaging spills have occurred over the past several years, and a great deal of concern has been expressed about other areas in which the failure of a pipeline would wreak potentially catastrophic environment damage.

A reliable, effective and economical method to prevent these spills at sensitive areas and/or to limit the environment damage is greatly needed. Likewise, a system is needed which can be applied to entire pipelines, or any section thereof.

SUMMARY

The system herein described is one which can provide the reduction of spill hazards that is needed. Once deployed, it would provide a very high level of assurance that a breach in a pipeline segment protected by the deployed installation would not result in any substantial contamination or environmental damage.

The invention includes several components, the most central and important of which is the provision of reduced or negative pressure in the section of the pipeline to be protected. This reduced or negative pressure is provided by placing a pump on the downstream side of the portion of the pipeline to be protected, or the "crossing," and a restriction to fluid flow on the upstream side of the crossing. In the preferred embodiment, the pressure inside the pipeline in the crossing segment will be lower than the ambient pressure. In most cases, this reference ambient pressure will be the lowest expected atmospheric pressure at the location of the crossing.

When the pressure is lower than the ambient, a breach in the pipeline will result in the ambient (water, air, muck in a bog, etc.) Being drawn into the pipeline, rather than the pipeline contents being expelled into the ambient. The transported material will not be discharged into the environment in the protected section; rather, the material in the protected section will be drawn into the pipeline, contaminating the transported material, but not the environment.

Several optional but highly desirable features are provided. First, a valve can be provided on the upstream side of the crossing to allow the flow of material to be shut off in the event of a breach in the protected section of the pipeline. In the preferred embodiment, this will be a differential-pressure actuated valve, installed upstream of the restrictor, which responds to the pressure change that will result from a pipeline breach downstream of the restrictor. When so equipped, the system can be applied to pipelines transporting gaseous materials, and while it will not Be possible to eliminate the discharge of the gaseous contents of the pipeline section downstream of the differential-pressure actuated valve and upstream of the nearest check valve, the flow would be automatically shut off, preventing material other than that present in pipeline between the valve and the nearest downstream check valve rom being released. When an automatic valve such as a differential-pressure actuated valve is installed in a liquids-carrying pipeline, it is desirable to provide a Fluid capacitor or accumulator upstream of the valve, so as to prevent pressure spikes upstream that would result from valve closure. This accumulator or capacitor may be of various designs, including a simple standpipe of adequate diameter and sufficiently tall to provide head pressure sufficient to overcome the incoming pressure in the pipeline, or a closed vessel in which the compression of air of other gas will provide the countervailing pressure. The specifics of this fluid capacitor will be engineered for each application to account for all of the variables, including, but not limited to, the pipeline size, velocity of the material being transported, viscosity of the material being transported, the elevations of the terrain over which the pipeline is constructed and the elevations of the protected segment.

Another desirable feature is a tank containing a purging solution that can be used to purge oil or other transported materials from the protected crossing after valve closure. Alternatively, a connection can be provided to allow the introduction of purging solution transported to the site when needed.

Yet another desirable feature is a tank on the downstream side of the crossing, downstream of the pump, to which transported material contaminated by ambient materials drawn into the pipeline through a breach can be directed for storage and later recovery or disposition, preventing contaminated material from being carried on downstream, possibly compromising downstream equipment and facilities, such as refineries. This tank would be isolated by a normally closed valve leading to the tank, and a normally open valve in the pipeline downstream of the intersection providing the connection to the tank. In the event of a breach, and subsequent closure of the valve on the upstream side of the crossing, the normally closed valve would be opened to allow material to be pumped into the tank, while the normally open valve would be closed to prevent further transport of material downstream.

A petroleum pipeline safety system for preventing contamination of an environmentally sensitive area close to a pipeline includes an upstream portion of the pipeline supplying a flow of fluid material, a crossing portion of the pipeline receiving the flow of fluid material from the upstream portion and conveying the flow of fluid material through the environmentally sensitive area to a downstream portion of the pipeline, the downstream portion, a pipeline pressure activated valve selectively capable of blocking the flow of fluid material from entering the crossing portion based upon a change in pressure within the crossing portion, and a fluid capacitor connected to the upstream portion configured to filter out a pressure spike in the upstream portion associated with the valve blocking the flow of fluid material.

The petroleum pipeline safety system can include a fluid capacitor configured to stabilize the pressure within the pipeline to stabilize operation of the pipeline pressure activated valve. Further, the pipeline pressure activated valve can include any of a differential pressure actuated valve, an electrically actuated valve, a hydraulically actuated valve, and a pneumatically actuated valve. Further, the system can include a flow restrictor downstream of the pipeline pressure activated valve and upstream of the crossing portion of the pipeline, wherein the flow restrictor is configured to create a lower pipeline internal pressure within the crossing portion as compared to a pipeline internal pressure within the upstream portion. The flow restrictor can be further configured to create the lower pipeline internal pressure within the crossing portion at a pressure lower than ambient atmosphere. The system can include, on the upstream side of the crossing portion and downstream of the valve, either a purging solution tank configured to release a purging solution into the crossing portion when the pipeline pressure activated valve blocks the flow of fluid material or a connection through which a purging solution may be introduced into the crossing portion. The system may also include, on the downstream side of the crossing portion and the pump, a contaminated material tank configured to receive a flow of contaminated material when the pipeline pressure activated valve blocks the flow of fluid material. The system can include a redundant pumping station configured to pump stationary fluid material from the crossing portion, for example, when the pipeline pressure activated valve is closed. The pumping station can include an electrical power generator. This emergency or backup electrical power generator may be installed to provide backup power to the primary pump as well, in the event of an electrical power failure. The fluid capacitor can include a closed top and an air portion trapped within the fluid capacitor, an open top and an air portion that can flow in and out of the fluid capacitor through the open top. An open top capacitor can include a floating ball check valve to prevent the flow of fluid material from flowing out of the open top. The fluid capacitor can be connected in-line with the pipeline. The system can further include a purging solution tank and a differential pressure actuated valve configured to release a purging solution from the purging solution tank into the crossing portion when the pipeline pressure activated valve blocks the flow of fluid material.

BRIEF DESCRIPTION OF THE DRAWINGS

For a better understanding of the present invention, and to show more clearly how it may be carried into effect, reference will now be made, by way of example, to the accompanying drawings, which show an exemplary embodiment of the present invention, and in which.

DETAILED DESCRIPTION

Figure 1:
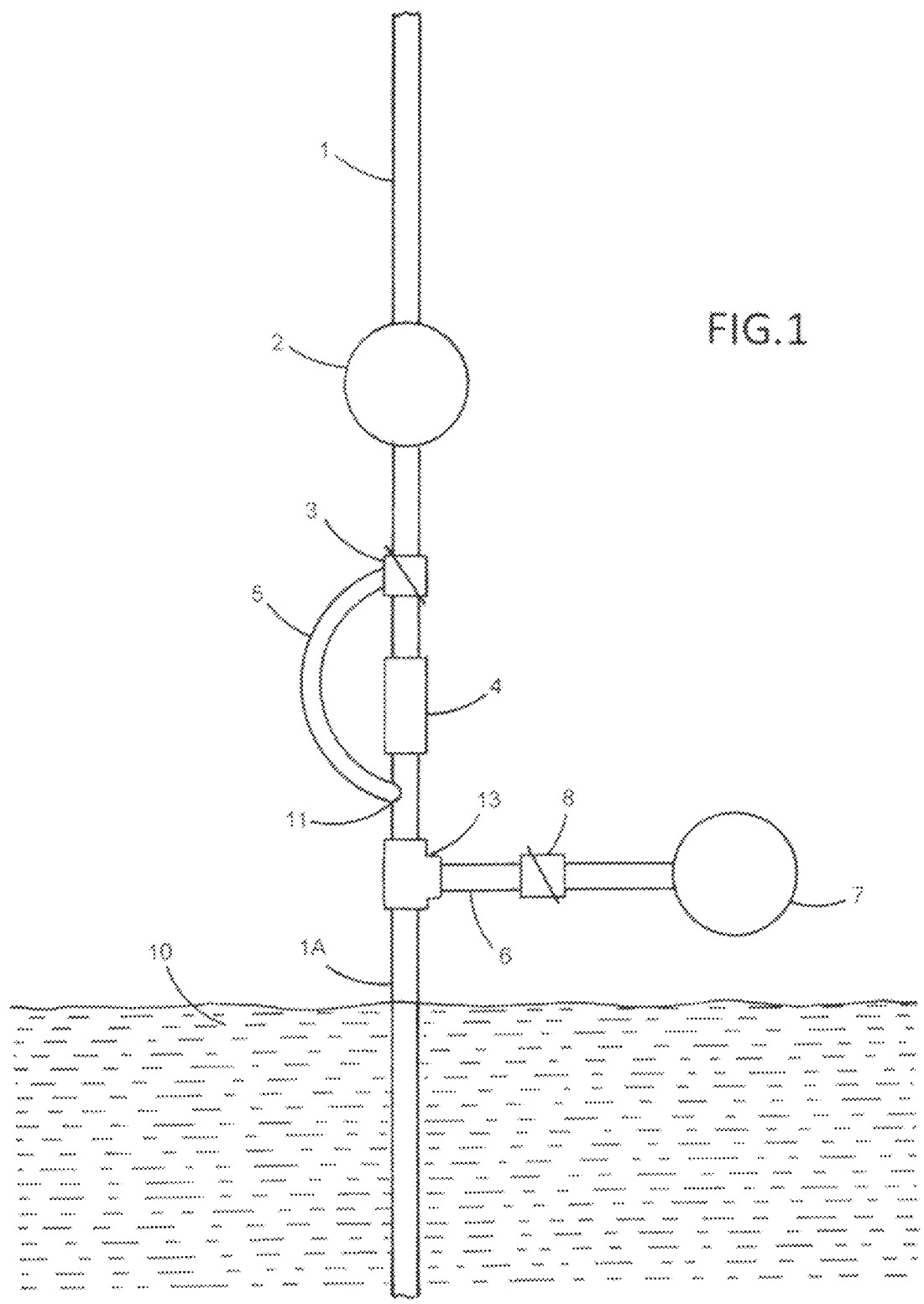
FIG. 1 is a plan view of the facility on the upstream side of the crossing, in accordance with the present disclosure.
Figure 2:
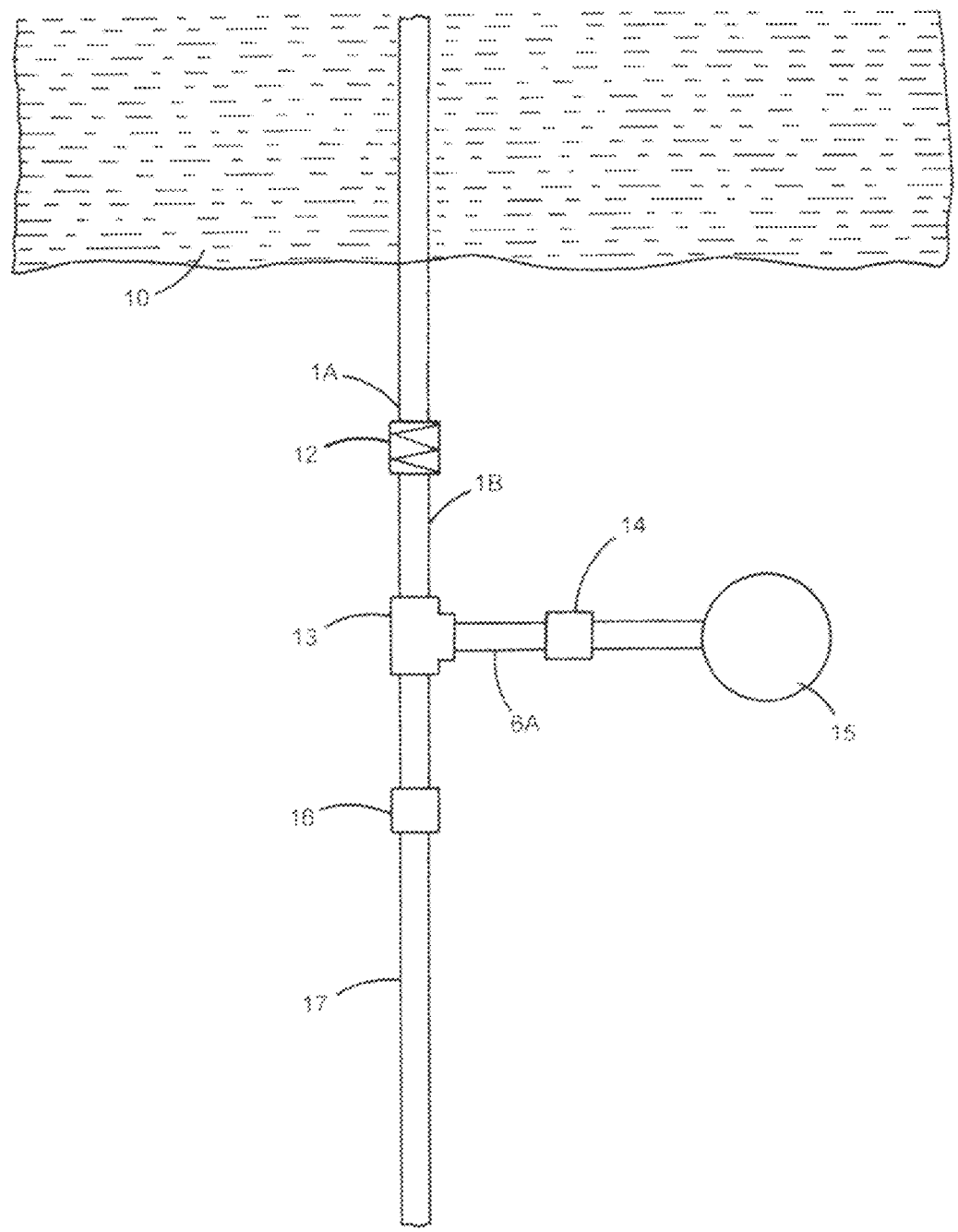
FIG. 2 is a plan view of the facility on the downstream side of the crossing, in accordance with the present disclosure.
Figure 3:
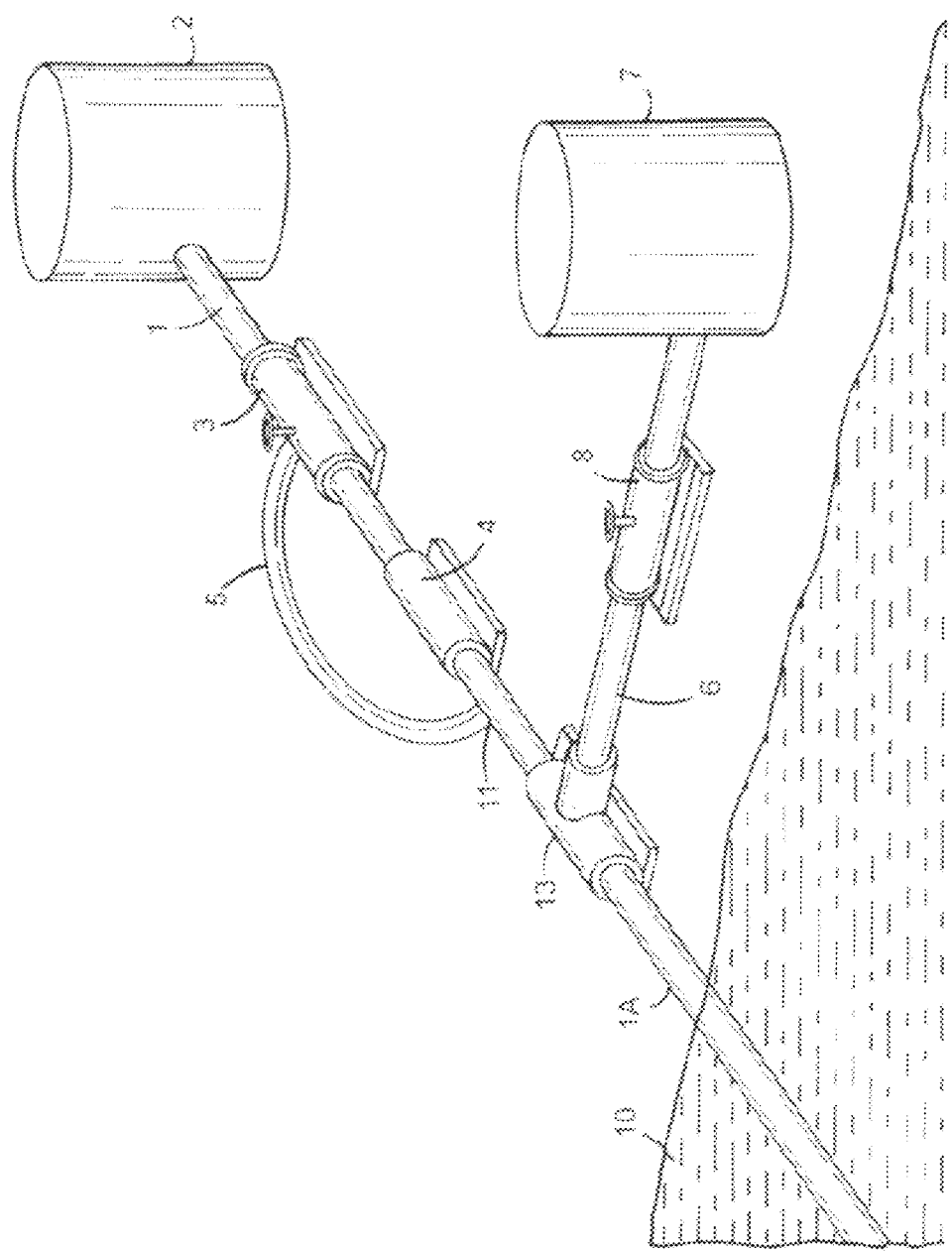
FIG. 3 is a perspective view of the facility on the upstream side of the crossing of FIG. 1, in accordance with the present disclosure.
Figure 4:
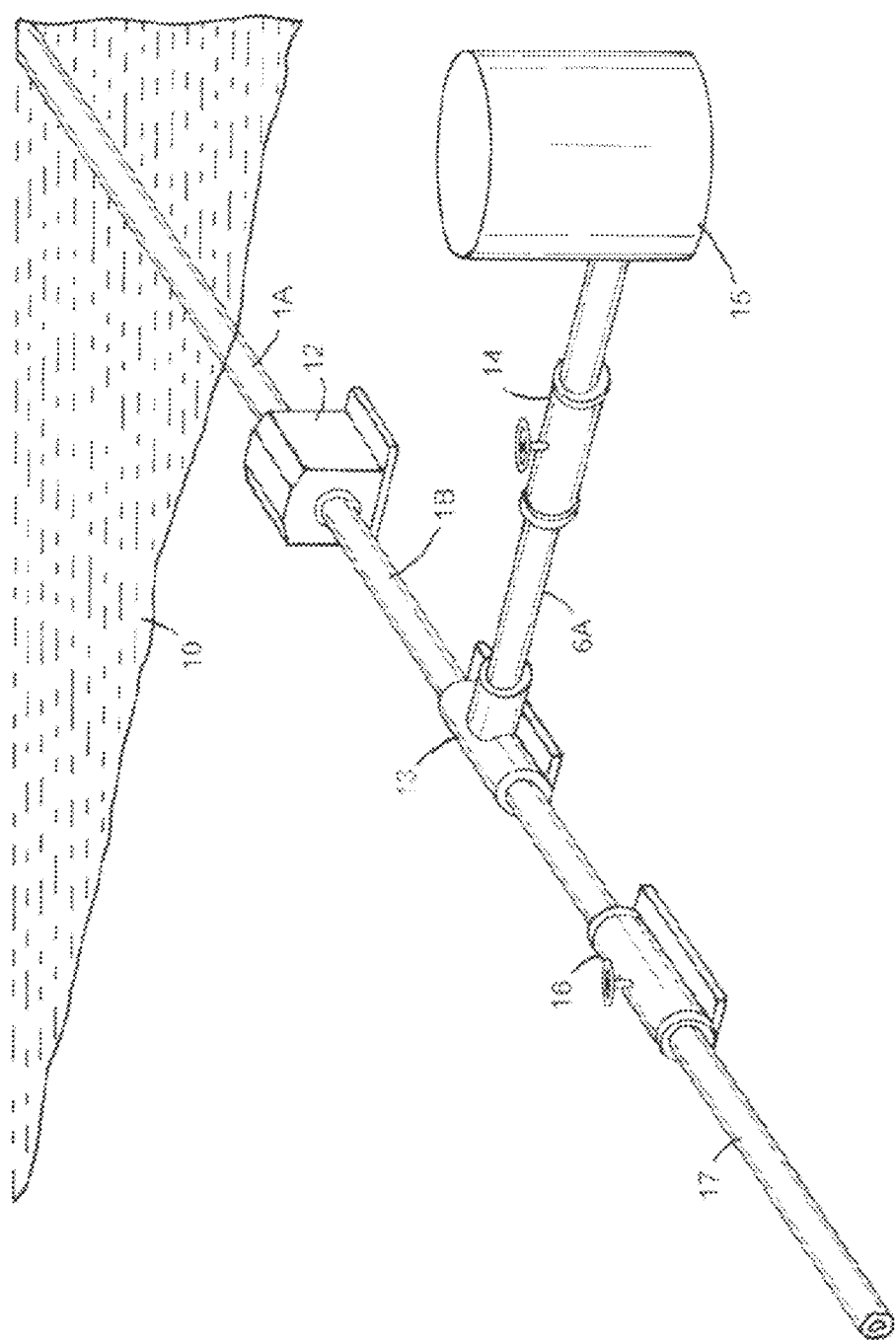
FIG. 4 is a perspective view of the facility on the downstream side of the crossing of FIG. 2, in accordance with the present disclosure.

As required, detailed embodiments of the present invention are disclosed herein. However, it is to be understood that the disclosed embodiments are exemplary only, and the invention may be embodied in various forms, especially so as to provide optimal performance in various environments and applications. The accompanying drawings are not intended to be to scale, and features may be exaggerated or minimized in order to best depict the system herein described. Therefore, the details disclosed herein are not to be interpreted as limiting, but merely as a representative basis for teaching one skilled in the art to variously employ the present invention.

Referring now to the drawings, wherein the numerals refer to the various features of the system, composed of various parts that comprise the whole.

As disclosed in this patent application, the system is comprised of an upstream and a downstream portion of the system.

The upstream portion is comprised of a restrictor, functioning to restrict flow so that the pump located on the downstream side of the crossing creates a lower, or negative pressure in the crossing portion of the pipeline. In the preferred embodiment, the upstream portion also includes a valve for shutting off flow in the event of a breach in the pipeline in the crossing section, and a fluid capacitor, or accumulator, upstream of the valve to prevent sudden pressure spikes upstream of the facility upon valve closure. Other features may include a connection through which a purging solution may introduced into the crossing section of the pipeline in order to evacuate transported material remaining in the crossing section of the pipeline alter valve closure so that there is minimal contamination resulting from the breach or the repairs of such breach. This connection may include a tank to keep purging materials present at all times, or can be used to introduce purging solution brought to the site as needed.

The downstream portion is comprised of a pump which draws transported material through the crossing section of the pipeline downstream of the restrictor. This downstream portion may include other features, such as a redundant pump that can be automatically engaged in the event of any failure of the primary pump, a generator system that may automatically start in the event of a power failure, and a tank for collecting potentially contaminated transported material to prevent compromise of downstream facilities.

FIGS. 1-4 illustrate an exemplary embodiment of the disclosed petroleum pipeline safety system. Pipeline 1 leads into optional fluid capacitor 2, or fluid accumulator, and then from fluid capacitor 2, to optional valve 3. Restrictor 4, is located downstream of the valve, when a valve is used. Whenever the valve is used and is a differential-pressure actuated valve, reduced-pressure supply tube 5, is installed between valve 3, and pipeline 1A, downstream of restrictor 4, through connection 11, in order to provide the lower pressure used to hold valve 3, in the open position. As shown, provision is made for introducing a purging solution into pipeline 1A, downstream of restrictor 4, through access pipe 6, connected to pipeline 1A, through connector 13, and provided with valve 8, which is normally closed. As shown, tank 7, is provided for holding a purging solution, but can be replaced with a connector for receiving purging solution transported to the site as needed. From this facility, pipeline 1A, proceeds into and across the crossing, or protected section of pipeline, 10.

Pipeline 1A, proceeds from crossing 10, to pump 12, and then downstream through pipeline 1B. As shown, there is optional holding tank 15, connected to pipeline 1B, through connector 13, and connection pipe 6A, through normally closed valve 14. When this tank is provided, second valve 16, normally open, is provided to shut off flow to pipeline 17, proceeding downstream of the downstream facility.

Figure 5:
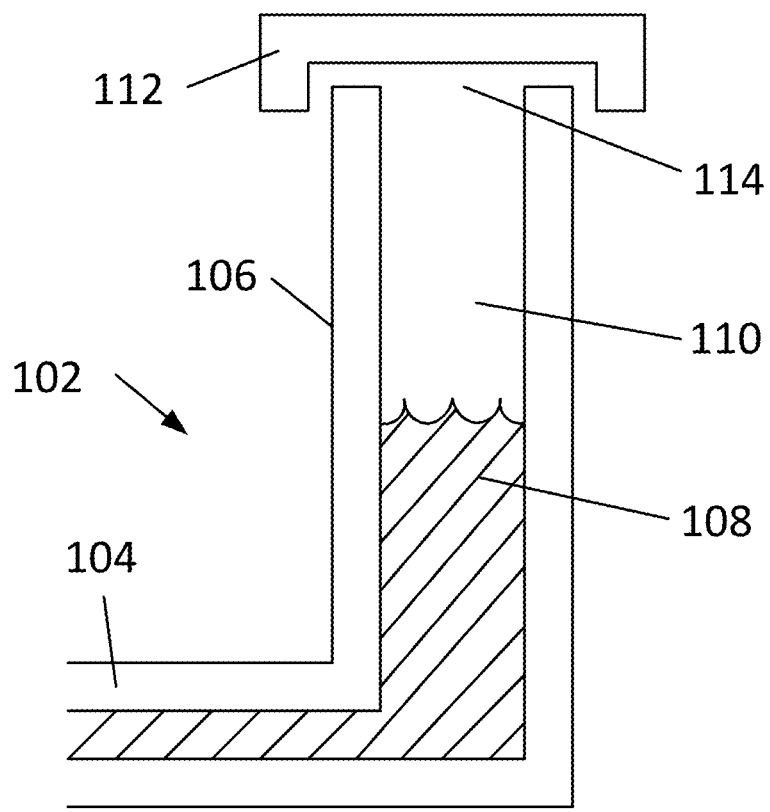
FIG. 5 illustrates an exemplary embodiment of a fluid capacitor which can be used with the pipeline of FIG. 1, in accordance with the present disclosure.

FIG. 5 illustrates an exemplary embodiment of a fluid capacitor which can be used with the pipeline of FIG. 1. Fluid capacitor 102 is illustrated, including capacitor supply tube 104 and capacitor column 106. Supply tube 104 is illustrated tapping from a neighboring pipeline. Capacitor column 106 includes a hollow interior which is filled in part with an oil portion 108 and an air portion 110. Capacitor column 106 includes open top 114. When pressure within supply tube 104 increases or decreases, the height of oil portion 108 within capacitor column 106 changes. Open top 114 permits air from air portion 110 to move in or out of column 106 when the height of oil portion 108 changes, the air within air portion 110 remaining at ambient pressure. Open top 114 includes optional cap 112 keeping rain and other contaminants from entering column 106.

Electronic capacitors are well known in the art and are used to filter out voltage spikes. Electronic capacitors include separated metallic plates and are known to resist changes in voltage, the changes in voltage taking time to charge the plates. Such resistance to changes in voltage can be used to filter the voltage, protecting the attached circuit from voltage spikes.

Pipelines are subject to pressure spikes, in particular, in relation to a sudden closing of a valve. Oil is a heavy fluid, and an entire pipeline of flowing oil can include substantial momentum. Sudden closure of a valve can cause all flow of oil to come to a sudden halt at the valve, thereby resulting in a significant pressure spike. Such pressure spikes can be destructive, exceeding the maximum pressure rating for the pipeline or attached equipment. Fluid capacitors as disclosed herein can filter out or resist sharp changes in pressure within the attached pipeline. In relation to fluid capacitor 102 of FIG. 5, changes in oil pressure or fluid pressure within supply tube 104 cause changes in height of oil portion 108. The resulting change in head pressure within capacitor column 106 acts to resist changes in the oil pressure within supply tube 104, thereby filtering out sharp spike in oil pressure.

Figure 6:
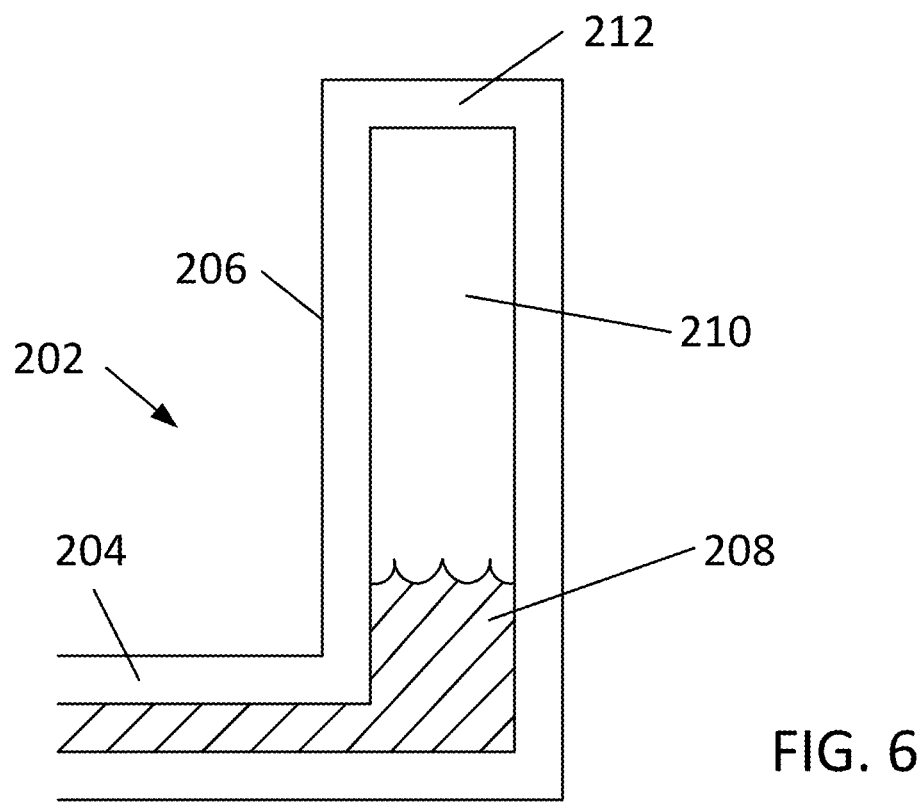
FIG. 6 illustrates an additional exemplary embodiment of a fluid capacitor which can be used with the pipeline of FIG. 1, in accordance with the present disclosure.

FIG. 6 illustrates an additional exemplary embodiment of a fluid capacitor which can be used with the pipeline of FIG. 1. Fluid capacitor 202 is illustrated, including capacitor supply tube 204 and capacitor column 206. Supply tube 204 is illustrated tapping from a neighboring pipeline. Capacitor column 206 includes a hollow interior which is filled in part with an oil portion 208 and an air portion 210. Capacitor column 206 includes closed top 212. Changes in oil pressure within supply tube 204 cause a change in height of oil portion 208. Because closed top 212 does not allow air from air portion 210 to escape, the change in height of oil portion 208 results in a change in air pressure within air portion 210. By permitting oil portion 208 to change in height, pressure spikes within supply 204 can be filtered.

Figure 7:
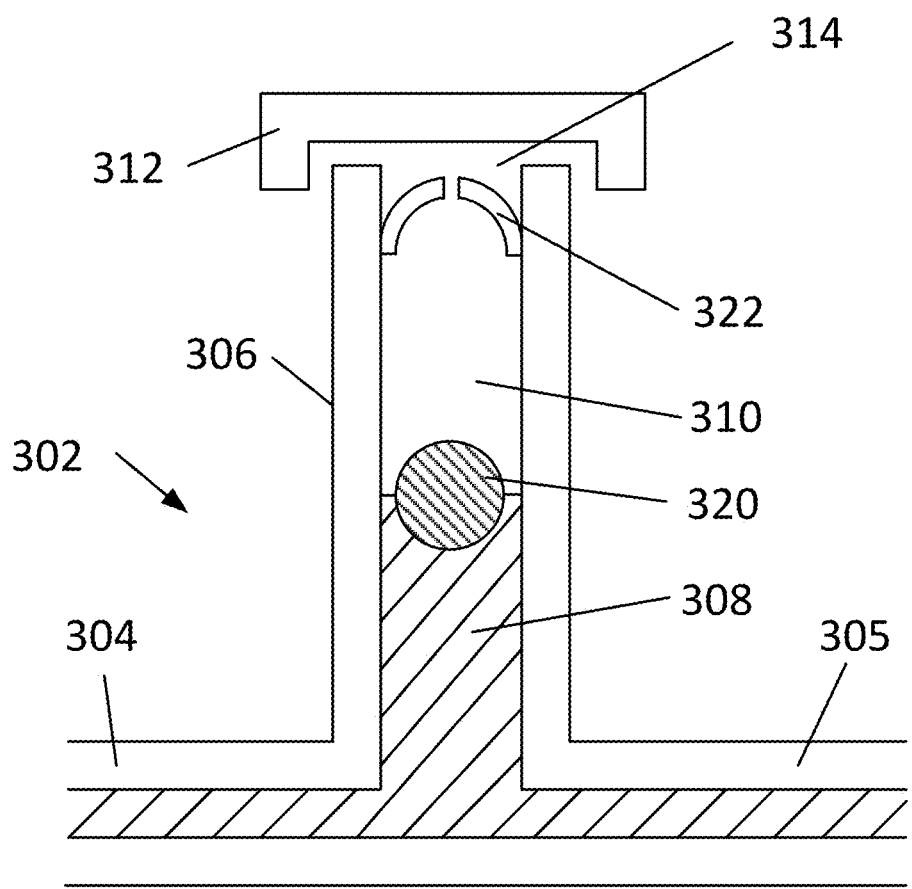
FIG. 7 illustrates an additional exemplary embodiment of a fluid capacitor which can be used with the pipeline of FIG. 1, in accordance with the present disclosure.

FIG. 7 illustrates an additional exemplary embodiment of a fluid capacitor which can be used with the pipeline of FIG. 1. Fluid capacitor 302 is illustrated, including first pipeline portion 304, capacitor column 306, and second pipeline portion 305. Fluid capacitor 302 is illustrated mounted to the illustrated pipeline portions as an in-line component. As an in-line component, in some embodiments, fluid capacitor 302 can react more quickly to changes in pipeline pressure than fluid capacitor 102 of FIG. 5. Capacitor column 306 includes a hollow interior which is filled in part with an oil portion 308 and an air portion 310. Capacitor column 306 includes open top 314. When pressure within pipeline portions 304 and 305 increase or decrease, the height of oil portion 308 within capacitor column 306 changes. Open top 314 permits air from air portion 310 to move in or out of column 306 when the height of oil portion 308 changes, the air within air portion 310 remaining at ambient pressure. Open top 314 includes optional cap 312 keeping rain and other contaminants from entering column 306. Fluid capacitor 302 is illustrated including an optional floating ball 320 within column 306 and a mating cap valve 322 within column 306. Air from air portion 310 can move past a hole in mating cap valve 322 and through neighboring open top 314. As fluid enters column 306 and the fluid level rises, floating ball 320 can engage with mating cap valve 322, block the hole in mating cap valve 322, and stop fluid from exiting the open top 314 of fluid capacitor 302. Floating ball 320 and mating cap valve 322 can collectively be described as a floating ball check valve within fluid capacitor 302.

Figure 8:
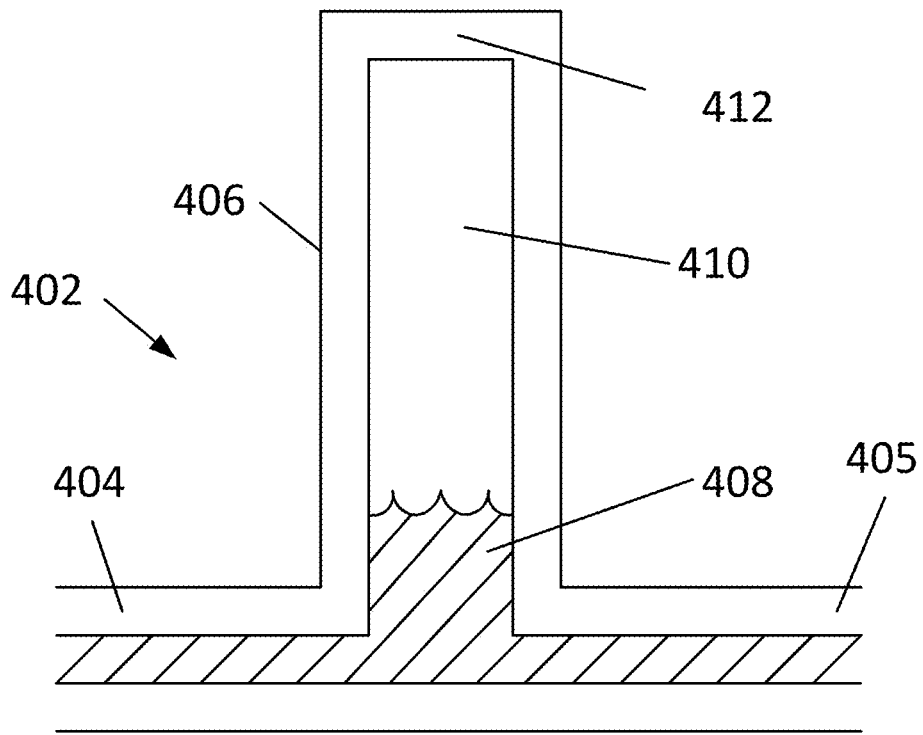
FIG. 8 illustrates an additional exemplary embodiment of a fluid capacitor which can be used with the pipeline of FIG. 1, in accordance with the present disclosure.

FIG. 8 illustrates an additional exemplary embodiment of a fluid capacitor which can be used with the pipeline of FIG. 1. Fluid capacitor 402 is illustrated, including first pipeline portion 404, capacitor column 406, and second pipeline portion 405. Fluid capacitor 402 is illustrated mounted to the illustrated pipeline portions as an in-line component. As an in-line component, in some embodiments, fluid capacitor 402 can react more quickly to changes in pipeline pressure than fluid capacitor 402 of FIG. 6. Capacitor column 406 includes a hollow interior which is filled in part with an oil portion 408 and an air portion 410. Capacitor column 406 includes closed top 412. Changes in oil pressure within pipeline portions 404 and 405 cause a change in height of oil portion 408. Because closed top 412 does not allow air from air portion 410 to escape, the change in height of oil portion 408 results in a change in air pressure within air portion 410. By permitting oil portion 408 to change in height, pressure spikes within supply 404 can be filtered.

Illustrated fluid capacitors can include different dimensions, proportions, and specific designs. The illustrated fluid capacitors are exemplary, and are not intended to be limiting to the disclosure.

The disclosed pipeline can include a valve that shuts automatically based upon changes in pressure within the pipeline. It will be appreciated that such a valve should be sensitive enough to catch significant leaks in the pipeline, for example, including changes of pressure in the pipeline without the pipeline being completely severed. However, the closing of the valve can be a significant event, for example, which can result in depriving a refinery of oil and requiring an operator to go to the valve and reset it. The valve can include a tuning mechanism for example, including an adjustable feedback loop within the pipeline, which can be used to filter out brief, insignificant changes in oil pressure while causing the required valve actuation for an actual failure of the pipeline. Such a filtering of the feedback pressure to the valve can include a fluid capacitor, such as the fluid capacitors described herein, to filter out momentary fluctuations in pressure.

A number of pipeline pressure activated valves can be used to stop a flow of oil, refined fuel, or other fluid materials through a pipeline to protect an environmentally sensitive area close to the pipeline. In one embodiment, the valve can be electrically activated, with pressure sensors within or attached to the pipeline providing a monitored value or values for use to control the valve. Similarly, a hydraulically or pneumatically controlled valve can similarly be utilized to control flow through the pipeline. In another embodiment a differential pressure actuated valve can be utilized, wherein no outside electrical or other power source is required. In such a valve, pressure from within the attached pipeline is used to maintain the valve in an open state, and when the pressure changes past a calibrated pressure value, the valve closes by action of the pipeline pressure acting upon the valve. An exemplary embodiment of a differential pressure actuated valve is disclosed in co-pending U.S. patent application Ser. No. 15/817,244 filed on Nov. 19, 2017, which is hereby incorporated by reference.

When a device or structure is said to be upstream of a portion of the pipeline, the device or structure is located or attached to the pipeline at a point from which the flow of fluid material flows toward the direction of the portion of the pipeline in question. When a device or structure is said to be downstream of a portion of the pipeline, the device or structure is located or attached to the pipeline at a point from to which the flow of fluid material flows from the portion of the pipeline in question.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A petroleum pipeline safety system for preventing contamination of an environmentally sensitive area close to a pipeline, the system comprising:
   a first portion of the pipeline including an upstream portion of the pipeline supplying a flow of fluid material;
   a second portion of the pipeline including a crossing portion of the pipeline, receiving the flow of fluid material from the upstream portion and conveying the flow of fluid material through the environmentally sensitive area to a downstream portion of the pipeline;
   a third portion of the pipeline including the downstream portion of the pipeline;
   a pipeline pressure activated valve selectively capable of blocking the flow of fluid material from entering the crossing portion based upon a change in pressure within the crossing portion;
   a flow restrictor downstream of the pipeline pressure activated valve and upstream of the crossing portion of the pipeline, wherein the flow restrictor is configured to create a lower pipeline internal pressure within the crossing portion as compared to a pipeline internal pressure within the upstream portion;
   a reduced-pressure supply tube including a first end and a second end and connected at the first end to the crossing portion of the pipeline and connected at the second end to the pipeline pressure activated valve, wherein reduced-pressure supply tube is configured to supply the lower pipeline internal pressure created by the flow restrictor to the pipeline pressure activated valve and wherein the pipeline pressure activated valve is a differential pressure actuated valve and is configured to be selectively held in an open position based upon the lower pipeline internal pressure; and
   a pump downstream of the crossing portion of the pipeline.

2. The petroleum pipeline safety system of claim 1, further comprising a fluid capacitor connected to the upstream portion configured to filter out a pressure spike in the upstream portion associated with the pipeline pressure activated valve blocking the flow of fluid material.

3. The petroleum pipeline safety system of claim 2, wherein the fluid capacitor is configured to stabilize the pressure within the pipeline to stabilize operation of the pipeline pressure activated valve.

4. The petroleum pipeline safety system of claim 2, wherein the fluid capacitor comprises a closed top and an air portion trapped within the fluid capacitor.

5. The petroleum pipeline safety system of claim 2, wherein the fluid capacitor is connected in-line with the pipeline.

6. The petroleum pipeline safety system of claim 1, wherein the flow restrictor is further configured to create the lower pipeline internal pressure within the crossing portion at a pressure lower than ambient atmosphere.

7. The petroleum pipeline safety system of claim 1, further comprising a purging solution tank configured to release a purging solution into the crossing portion when the pipeline pressure activated valve blocks the flow of fluid material.

8. The petroleum pipeline safety system of claim 1, further comprising a redundant pumping station configured to pump stationary fluid material from the crossing portion.

9. The petroleum pipeline safety system of claim 8, further comprising an electrical power generator attached to the redundant pumping station.

10. The petroleum pipeline safety system of claim 1, further comprising:
   a purging solution tank; and
   a differential pressure actuated valve configured to release a purging solution from the purging solution tank into the crossing portion when the pipeline pressure activated valve blocks the flow of fluid material.

11. A petroleum pipeline safety system for preventing contamination of an environmentally sensitive area close to a pipeline, the system comprising:
- a first portion of the pipeline including an upstream portion of the pipeline supplying a flow of fluid material;
- a second portion of the pipeline including a crossing portion of the pipeline, receiving the flow of fluid material from the upstream portion and conveying the flow of fluid material through the environmentally sensitive area to a downstream portion of the pipeline;
- a third portion of the pipeline including the downstream portion of the pipeline;
- a pipeline pressure activated valve selectively capable of blocking the flow of fluid material from entering the crossing portion based upon a change in pressure within the crossing portion;
- a fluid capacitor connected to the upstream portion configured to filter out a pressure spike in the upstream portion associated with the pipeline pressure activated valve blocking the flow of fluid material, wherein the fluid capacitor is connected in-line with the pipeline;
- a flow restrictor downstream of the pipeline pressure activated valve and upstream of the crossing portion of the pipeline, wherein the flow restrictor is configured to create a lower pipeline internal pressure within the crossing portion as compared to a pipeline internal pressure within the upstream portion and at a pressure lower than ambient atmosphere;
- a reduced-pressure supply tube including a first end and a second end and connected at the first end to the crossing portion of the pipeline and connected at the second end to the pipeline pressure activated valve, wherein reduced-pressure supply tube is configured to supply the lower pipeline internal pressure created by the flow restrictor to the pipeline pressure activated valve and wherein the pipeline pressure activated valve is a differential pressure actuated valve and is configured to be selectively held in an open position based upon the lower pipeline internal pressure; and
- a pump downstream of the crossing portion of the pipeline.

12. The petroleum pipeline safety system of claim 11, further comprising:
- a purging solution tank configured to release a purging solution into the crossing portion when the pipeline pressure activated valve blocks the flow of fluid material.

* * * * *